(12) United States Patent
Yoshimine et al.

(10) Patent No.: US 7,514,179 B2
(45) Date of Patent: Apr. 7, 2009

(54) CONTROL VALVE TYPE LEAD BATTERY

(75) Inventors: Toshifumi Yoshimine, Toyohashi (JP); Takehiro Sasaki, Kosai (JP); Tomotaka Fujimori, Kosai (JP)

(73) Assignee: Panasonic Corporation, Osaka (JP)

( * ) Notice: Subject to any disclaimer, the term of this patent is extended or adjusted under 35 U.S.C. 154(b) by 118 days.

(21) Appl. No.: 10/520,894

(22) PCT Filed: Jun. 12, 2003

(86) PCT No.: PCT/JP03/07521

§ 371 (c)(1),
(2), (4) Date: Jan. 11, 2005

(87) PCT Pub. No.: WO2004/010526

PCT Pub. Date: Jan. 29, 2004

(65) Prior Publication Data

US 2006/0154148 A1   Jul. 13, 2006

(30) Foreign Application Priority Data

Jul. 19, 2002 (JP) ............................. 2002-210751

(51) Int. Cl.
*H01M 4/68* (2006.01)
(52) U.S. Cl. ...................................... 429/225; 429/233
(58) Field of Classification Search ................. 429/225, 429/236, 245, 226, 228, 233, 234, 241, 227
See application file for complete search history.

(56) References Cited

U.S. PATENT DOCUMENTS

| | | | | |
|---|---|---|---|---|
| 4,391,036 A | * | 7/1983 | Kishimoto et al. | 29/623.2 |
| 4,473,623 A | * | 9/1984 | Ishikura et al. | 429/48 |
| 7,060,391 B2 | * | 6/2006 | Gyenge et al. | 429/245 |

FOREIGN PATENT DOCUMENTS

| | | |
|---|---|---|
| JP | 61-080769 | 4/1986 |
| JP | 08-339819 | 12/1996 |
| JP | 10-302783 | 11/1998 |
| JP | 11-040186 | 2/1999 |

* cited by examiner

*Primary Examiner*—Patrick Ryan
*Assistant Examiner*—Monique Wills
(74) *Attorney, Agent, or Firm*—McDermott Will & Emery LLP

(57) ABSTRACT

A valve-regulated lead-acid battery of this invention includes: an electrode plate group; and an electrolyte impregnated into and retained by the electrode plate group. The electrode plate group includes: positive electrode plates that each include a positive electrode current collector comprising a Sn-containing lead alloy, and a positive electrode active material retained by the positive electrode current collector; negative electrode plates that each include a negative electrode current collector comprising a lead alloy, and a negative electrode active material retained by the negative electrode current collector; and separators. The Sn content in the positive electrode current collector is 1.1 to 3.0% by mass, and the pore volume per unit mass of the negative electrode active material is 0.115 to 0.150 $cm^3/g$.

By employing the above configuration, the negative electrode plate has a stable oxygen-absorbing ability, and the corrosion of the current collector of the positive electrode plate is suppressed, so that it is possible to obtain a valve-regulated lead-acid battery with a stable long life.

2 Claims, 2 Drawing Sheets

# CONTROL VALVE TYPE LEAD BATTERY

TECHNICAL FIELD

The present invention relates to a valve-regulated lead-acid battery.

BACKGROUND ART

With the development of information equipment such as communications equipment, there has recently been a demand for lead-acid batteries having a high voltage and a high capacity as the batteries used in such equipment. At the same time, there has also been a demand to reduce the maintenance work of lead-acid batteries and, particularly, prolong their life.

To meet such demands, many proposals have conventionally been made on valve-regulated lead-acid batteries. Maintenance work reduction is made by causing an electrolyte to be substantially contained in the micropores of a positive electrode plate, a negative electrode plate and a mat separator made of glass fiber, and causing the negative electrode plate to absorb oxygen gas generated from the positive electrode plate in the last stage of charging. This can suppress the electrolysis of water, thereby preventing the loss of the electrolyte.

Meanwhile, in valve-regulated lead-acid batteries, a free electrolyte does not exist in some cases, or the amount of the electrolyte is limited to a minimum in other cases. Thus, when a battery is used, the battery can be placed in free orientations; for example, it may also be placed sideways for use. With respect to large-sized batteries, in particular, a plurality of batteries that are placed sideways with their terminals at the front may be electrically connected in series, to be used as a battery set.

As for the prolongation of battery life, the pressure exerted on the electrode plate group is usually heightened to press the positive electrode active material by the separator, thereby suppressing the expansion of the positive electrode active material and preventing the separation of the positive electrode active material. However, with an increase in battery size, it has become difficult to exert an adequate pressure on the electrode plate group and maintain such a state even when the material of the battery container is changed or the battery container walls are thickened for strengthening the battery container. Further, in recent years, long-life batteries with a lifespan of 10 years or more have been required.

In lead-acid batteries, the corrosion of their positive electrode current collector due to oxidation progresses as the period of use becomes longer. Consequently, the cross-sectional area of the positive electrode current collector is decreased, thereby impairing the conductivity of the whole positive electrode plate. This results in degradation in voltage characteristics during high rate discharge of the battery. If such corrosion of the positive electrode current collector proceeds further, this will ultimately lead to breaking of the positive electrode current collector itself. As a result, the battery capacity decreases rapidly, and the battery reaches the end of its life.

In valve-regulated lead-acid batteries, the oxygen gas generated from the positive electrode plate is absorbed by the negative electrode plate, as described above, so that the scattering and discharging of the oxygen gas to the outside of the battery is suppressed. However, if the amount of gas the negative electrode plate can absorb is smaller than the amount of the oxygen gas generated at the positive electrode plate, the oxygen gas inside the battery is discharged to the outside of the battery, resulting in a decrease in the electrolyte. In contrast, if the negative electrode plate has a sufficient oxygen-gas absorbing ability, the battery voltage lowers during charge and the charge current increases during constant voltage charge. This promotes the above-described corrosion of the positive electrode current collector, thereby shortening the battery life.

As a method for preventing such corrosion of the positive electrode current collector, it is known to use a Pb—Ca—Sn alloy for the positive electrode current collector and increase the Sn content in this alloy to make the alloy crystals finer. For example, Japanese Laid-Open Patent Publication No. Hei 11-40186 discloses that the Sn content in the alloy constituting the positive electrode current collector is set to 1.05 to 1.50% by mass, in order to suppress the corrosion of the positive electrode current collector which is remarkable when the ratio of the positive electrode active material amount to the negative electrode active material amount is set to a relatively small range of 0.69 to 0.75.

However, such adjustments in the ratio of the positive electrode active material amount to the negative electrode active material amount and the specific surface area of the negative electrode active material can suppress a thermal runaway due to increased trickle current and battery life shortening, but these techniques only are not sufficient in cases a long life of 10 years or more is required.

Further, when a plurality of such batteries are connected in series to form a battery set having a voltage high enough to back-up a commercial power source, if there are large variations in the gas-absorbing abilities of the negative electrodes of the batteries, the charge voltages of the batteries vary. In this case, some batteries of the battery set become insufficiently charged or overcharged, which become factors causing a rapid shortening of the life of the whole battery set.

In order to solve the above-mentioned problems, it is therefore an object of the present invention to provide a valve-regulated lead-acid battery that is particularly suitable for use as a back-up power source and that has a stable long life.

DISCLOSURE OF INVENTION

A valve-regulated lead-acid battery in accordance with the present invention includes: an electrode plate group; and an electrolyte impregnated into and retained by the electrode plate group. The electrode plate group includes: positive electrode plates that each include a positive electrode current collector comprising a Sn-containing lead alloy, and a positive electrode active material retained by the positive electrode current collector; negative electrode plates that each include a negative electrode current collector comprising a lead alloy, and a negative electrode active material retained by the negative electrode current collector; and separators. It is characterized in that the Sn content in the positive electrode current collector is 1.1 to 3.0% by mass, and that the pore volume per unit mass of the negative electrode active material is 0.115 to 0.150 $cm^3/g$.

It is preferred that the Sn content in the positive electrode current collector be 1.6 to 2.5% by mass.

It is preferred that part of the electrolyte be a free electrolyte that is free from the electrode plate group, and that the free electrolyte be in contact with the separators.

BEST MODE FOR CARRYING OUT THE INVENTION

Figure 1:
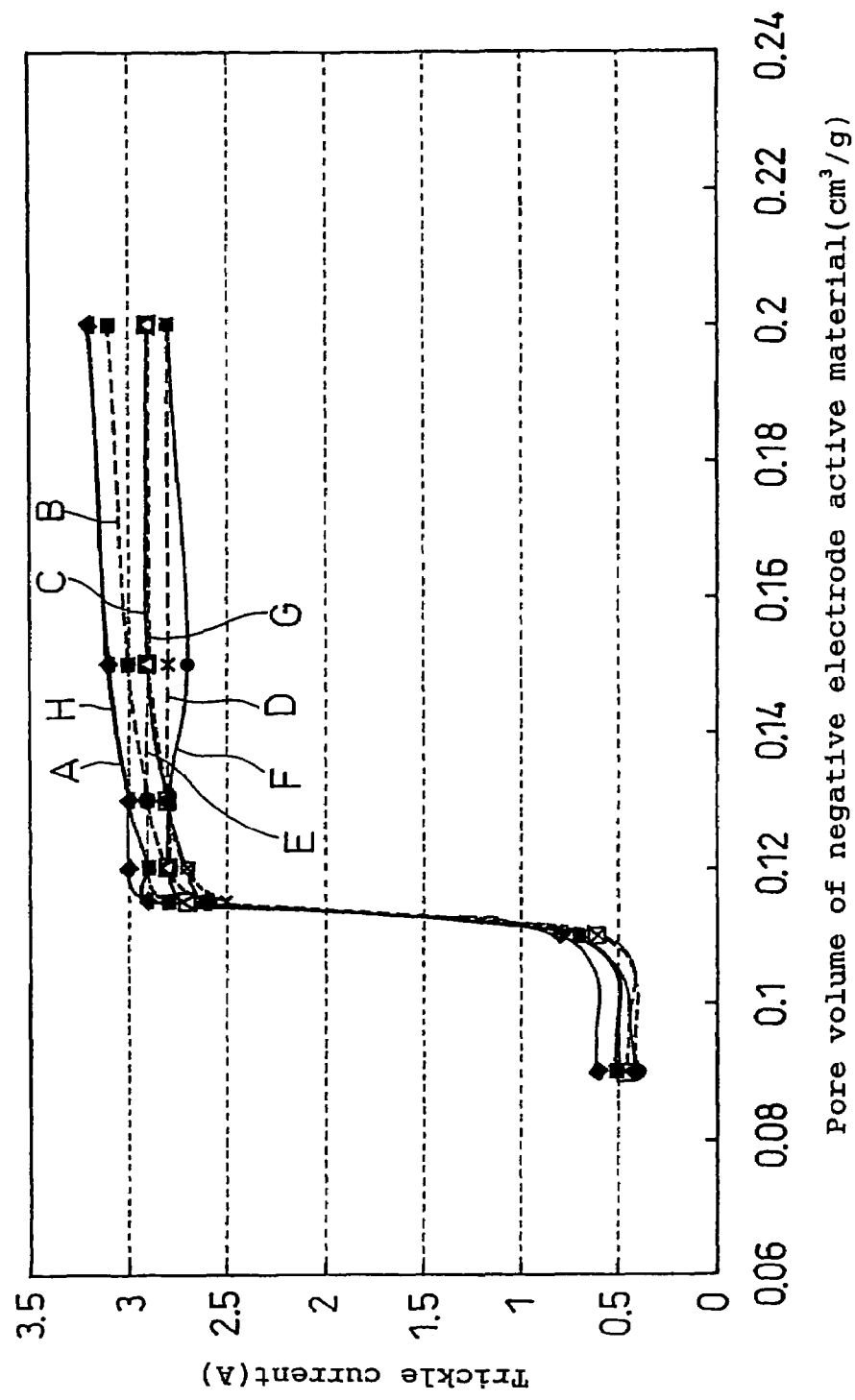
FIG. 1 is a graph showing the relation between the pore volume of a negative electrode active material and trickle current.

The present invention relates to a valve-regulated lead-acid battery including: an electrode plate group; and an electrolyte impregnated into and retained by the electrode plate group. The electrode plate group includes: positive electrode plates that each include a positive electrode current collector comprising a Sn-containing lead alloy, and a positive electrode active material retained by the positive electrode current collector; negative electrode plates that each include a negative electrode current collector comprising a lead alloy, and a negative electrode active material retained by the negative electrode current collector; and a separator. Therein, the Sn content in the positive electrode current collector is 1.1 to 3.0% by mass, and the pore volume per unit mass of the negative electrode active material is 0.115 to 0.150 $cm^3/g$.

In this way, when the pore volume of the negative electrode active material is regulated to 0.115 to 0.150 $cm^3/g$, the negative electrode plate has an excellent gas-absorbing ability, so that the oxygen gas generated at the positive electrode plate is absorbed by the negative electrode plate in a reliable manner. However, during trickle charge, the charge current (trickle current) increases, and the positive electrode current collector is susceptible to corrosion. Therefore, according to the present invention, by further increasing the Sn content of the positive electrode current collector to 1.1 to 3.0% by mass, the alloy crystals of the current collector are made finer, thereby suppressing the corrosion of the current collector. This makes it possible to obtain a lead-acid battery having a stable long life.

Also, the negative electrode plate according to the present invention allows gas absorption reaction to proceed stably. Hence, when a plurality of batteries according to the present invention are connected in series as unit batteries to form a battery set, the charge voltages of the respective batteries exhibit reduced variations, so that the shortening of the life of the battery set caused by the variations can be suppressed.

As the positive electrode current collector, a Pb—Sn alloy, a Pb—Ca—Sn alloy or the like is used.

Further, it is more preferred that the Sn content in the positive electrode current collector be 1.6 to 2.5% by mass, since the trickle life characteristics are particularly excellent.

The lead alloy used in the negative electrode current collector is not particularly limited; however, from the viewpoint of grid strength, it is preferred to use a Pb alloy, such as a Pb—Ca alloy, a Pb—Sn alloy, or a Pb—Ca—Sn alloy, which includes an element that does not substantially decrease the hydrogen overvoltage of Pb, such as Ca or Sn.

Further, it is more preferred that the pore volume per unit mass of the negative electrode active material be 0.13 to 0.15 $cm^3/g$, since the trickle life characteristics are particularly excellent.

An example of a method for controlling the pore volume of the negative electrode active material is a method of adjusting the amounts of water and sulfuric acid to be added when an active material of a raw material lead powder is kneaded in the process of preparing a negative electrode active material.

The positive electrode plate and the negative electrode plate can be obtained by applying a positive electrode paste and a negative electrode paste onto the positive electrode current collector and the negative electrode current collector, respectively, by an ordinary method, and then curing and drying them. The positive electrode paste can be obtained, for example, by adding predetermined amounts of water and dilute sulfuric acid to a raw material lead powder (a mixture of lead and a lead oxide) and kneading the resultant mixture. Also the negative electrode paste can be obtained, for example, by adding a lignin compound or barium sulfate as an expander to a raw material lead powder, further adding predetermined amounts of water and dilute sulfuric acid, and kneading the resultant mixture.

As the separator, for example, a glass fiber mat capable of impregnating and retaining an electrolyte is used.

Also, it is preferred that part of the electrolyte be a free electrolyte that is free from the electrode plate group, and that the free electrolyte be in contact with the separator. Therein, being free from the electrode plate group refers to a state in which the amount of the electrolyte is larger than the amount the electrode plate group is capable of retaining, i.e., part of the electrolyte existing outside the electrode plate group without being retained inside the electrode plate group. In such a state, the ratio (A/B) of the volume (A) of the pore inside the separator to the volume (B) of the electrolyte impregnated and retained in the pore can be kept constant. Accordingly, the oxygen gas permeability of the separator becomes stabilized, thereby making it possible to further suppress the variations in oxygen gas absorption reaction in the negative electrode.

EXAMPLE 1 AND COMPARATIVE EXAMPLE 1

(i) Preparation of Positive Electrode Plate

Using a Pb—Ca—Sn alloy containing 0.08% by mass of Ca and x % by mass of Sn, positive electrode current collectors having a length of 460 mm, a width of 150 mm, a thickness of 7.0 mm, and a weight of 950 g were obtained by a casting process. At this time, the Sn content x in the positive electrode current collector was varied such that x=0.6, 0.8, 1.1, 1.6, 2.2, 2.5, 3.0, 3.5. The respective positive electrode current collectors thus obtained were named current collectors A to H.

Meanwhile, a positive electrode paste was obtained by adding predetermined amounts of water and dilute sulfuric acid to a raw material lead powder (a mixture of lead and a lead oxide) and kneading the resultant mixture.

The positive electrode paste of 1640 g obtained in the above manner was applied to the positive electrode current collectors A to H and was cured and dried by an ordinary method, to produce positive electrode plates A to H.

(ii) Preparation of Negative Electrode Plate

A negative electrode paste was obtained by adding predetermined amounts of water and sulfuric acid to a raw material lead powder to which predetermined amounts of lignin and barium sulfate were added as additives, and kneading the resultant mixture. At this time, in order to obtain negative electrode active materials having different pore volumes, the amounts of water and sulfuric acid to be added to the raw material lead powder were varied.

Using a Pb—Ca alloy containing 0.08% by mass of Ca, negative electrode current collectors having a length of 460 mm, a width of 150 mm, a thickness of 3.8 mm, and a weight of 640 g were obtained by a casting process.

The negative electrode paste of 1120 g obtained in the above manner was applied to the negative electrode current collectors thus obtained and was cured and dried by an ordinary method, to produce negative electrode plates.

These negative electrode plates were assembled into a battery which will be described later, and the battery was charged for formation. Thereafter, the pore volumes of the negative electrode active materials were measured with a porosimeter. As a result, the pore volumes of the negative electrode active materials in these negative electrode plates were 0.090, 0.110, 0.115, 0.120, 0.130, 0.150, 0.160 and 0.200 cm$^3$/g.

(iii) Fabrication of Battery

Twelve positive electrode plates and thirteen negative electrode plates obtained in the above manner were alternately stacked, with separators made of a 4.4 mm-thick glass fiber mat interposed therebetween, to obtain an electrode plate group. The electrode plate group was then placed in a battery container. At this time, pressure was applied to the electrode plate group such that the separators were compressed in their thickness direction by a pressure of 10 kgf/dm$^2$. Thereafter, the battery container was covered with a lid equipped with a safety valve. The battery container and the lid used therein were the same as conventional ones. Subsequently, dilute sulfuric acid was injected into the battery, and the battery was charged for formation, to produce a 2 V-1200 Ah battery. After the charge for formation, the specific gravity of the electrolyte was 1.310 g/cm$^3$, and all the electrolyte was retained by the electrode plate group, so that there was substantially no free electrolyte. Also, the amount of the electrolyte was 13300 ml per 1 cell.

In the above process, batteries, each configured by combining positive electrode plates A and negative electrode plates having one of the different pore volumes, were named battery group A. Likewise, battery groups, configured by combining positive electrode plates B to H and negative electrode plates having different pore volumes, were named battery groups B to H, respectively.

Then, each battery of the battery groups A to H was subjected to the following evaluation.

[Evaluation]

① Evaluation of Negative Electrode's Gas-Absorbing Ability

Each battery was trickle-charged at a constant voltage of 2.25 V in an atmosphere of 60° C. Then, at the point of elapse of 48 hours following the start of the charge, the charge current (trickle current) value was measured to examine the effect of the pore volumes of the negative electrodes on the gas-absorbing ability.

② Trickle Life Test

Each battery was trickle-charged at a constant voltage of 2.25 V in an atmosphere of 60° C. Each time one month elapsed, each battery was discharged at a discharge current of 0.17 CA until the battery voltage reached 1.75 V, to measure its discharge capacity. At the point when the discharge capacity decreased to 80% of the initial capacity, the battery was determined as having reached the end of its life.

FIG. 1 shows the results of measurement of the trickle current at the point of elapse of 48 hours from the start of the trickle charge of each battery.

FIG. 1 shows that when the pore volume of the negative electrode active material is 0.115 cm$^3$/g or more, the trickle current is large. This indicates that the absorption of oxygen gas in the negative electrode plate is sufficient and stable. The negative electrode active material absorbs oxygen gas through an electrolyte film formed on its surface. However, if the pore volume of the negative electrode active material becomes smaller, the absorption of the oxygen gas generated from the positive electrode plate becomes insufficient in the negative electrode plate. For this reason, it is thought that the potential of the negative electrode plate does not lower, leading to a decrease in the trickle current. Therefore, when the pore volume of the negative electrode active material is less than 0.115 cm$^3$/g, the remaining oxygen gas not absorbed by the negative electrode plate increases in the cell, causing a rise in inner pressure. This rise activates the safety valve, so that the oxygen gas is released into the atmosphere. This decreases the water content in the electrolyte and heightens the concentration of the electrolyte, thereby resulting in shortening of the battery life. With regard to the Sn content in the positive electrode current collector, this content was found not to have a remarkable effect on the trickle current value.

Figure 2:
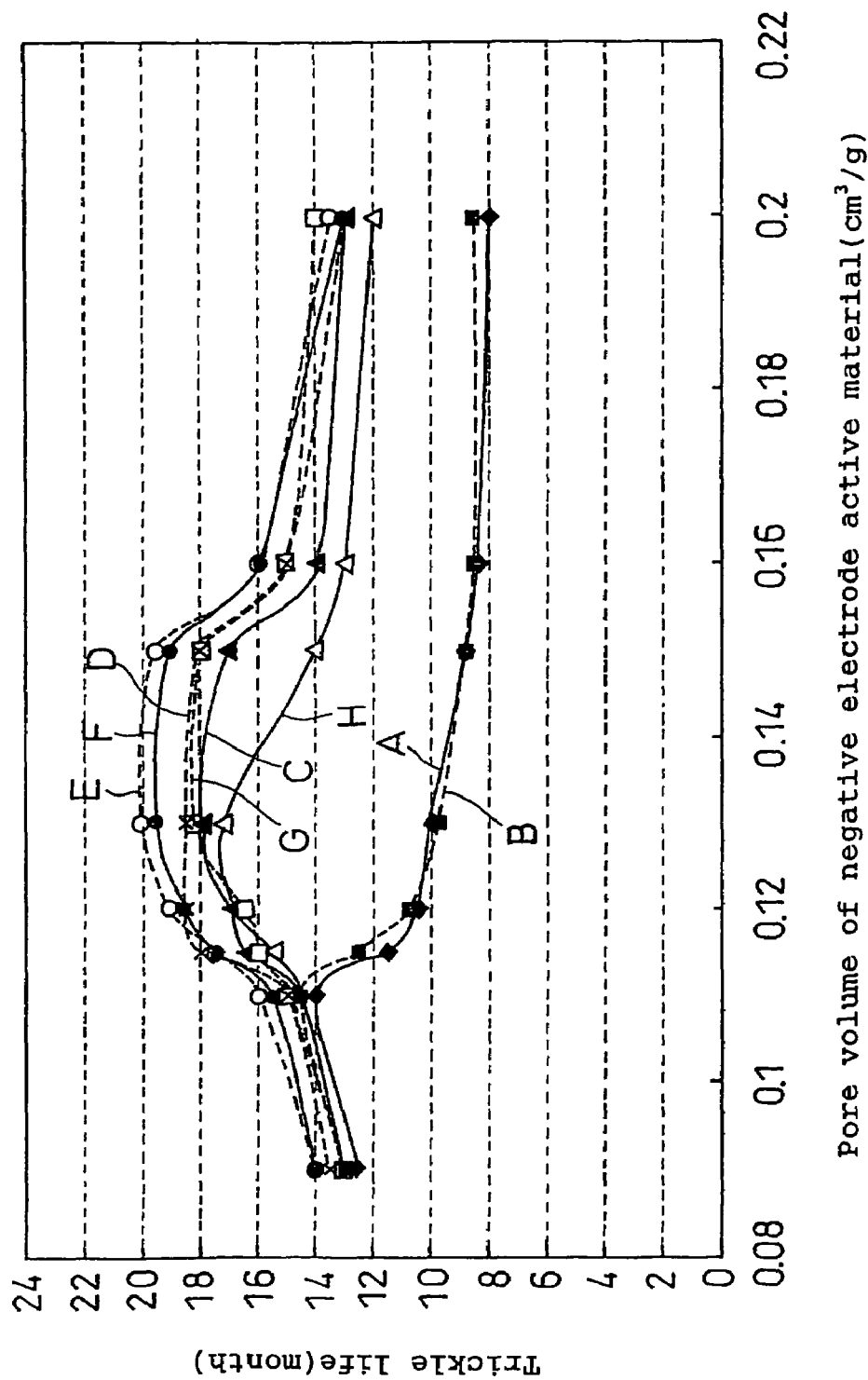
FIG. 2 is a graph showing the relation between the pore volume of the negative electrode active material and trickle life.

FIG. 2 shows the results of the trickle life test of each battery.

FIG. 2 shows that the battery groups C to G, in which the Sn content in the positive electrode current collector is 1.1 to 3.0% by mass, produce good trickle life characteristics when the pore volume of the negative electrode active material is 0.115 to 0.150 cm$^3$/g. It indicates that among them, the battery groups D to F, in which the Sn content is 1.6 to 2.5% by mass, can produce particularly good trickle life characteristics. When the pore volume of the negative electrode active material is 0.115 to 0.150 cm$^3$/g, the oxygen gas absorption reaction becomes stabilized, while the trickle current increases. However, since the Pb alloy of the positive electrode current collector contains 1.1 to 3.0% by mass of Sn, the corrosion of the positive electrode current collector can be suppressed.

Upon completion of the trickle life test, the batteries were decomposed to examine the condition of their electrode plates. In the battery groups A and B, in which the Sn content of the positive electrode current collector is less than 1.1% by mass, when the pore volume of the negative electrode active material is not less than 0.115 cm$^3$/g at which the trickle current increases, the positive electrode current collector was found to be in an advanced stage of corrosion, because the effect of Sn is small.

Also, in the batteries in which the pore volume of the negative electrode active material is less than 0.115 cm$^3$/g, the water content in the electrolyte was decreased, and hence, the softening and separation of the positive electrode active material due to its pulverization were remarkable. In such batteries, although the trickle current value is small, the absorption of the oxygen gas in the negative electrode plate is insufficient, so that the water content in the electrolyte was reduced, and the battery internal resistance increased rapidly. Further, the reduced water content caused an increase in the sulfuric acid concentration of the electrolyte, thereby promoting the softening and separation of the positive electrode active material due to its pulverization. These are presumed to be the causes of the rapid decline in capacity. However, the corrosion of the positive electrode current collectors of these batteries was not remarkable.

EXAMPLE 2

In the same manner as in Example 1, negative electrode plates in which the pore volume of the negative electrode active material was 0.120 cm$^3$/g were produced. Batteries A1 were produced in the same manner as in Example 1, except for the use of these negative electrode plates and the positive electrode plates E of Example 1.

Then, 6 batteries A1 were connected in series to form a battery set A1-12 of 12V, and 24 batteries A1 were connected in series to form a battery set A1-48 of 48 V.

EXAMPLE 3

A predetermined amount of the electrolyte was further injected into the batteries A1 of Example 2. And, batteries A2 having a free electrolyte, free from the electrode plate group, at the bottom of the battery container, were produced. At this time, the amount of the free electrolyte was set such that even when the battery was placed sideways, the electrolyte did not leak out of the battery upon opening of the safety valve and soaked part of the separators constituting the electrode plate group.

Then, a plurality of the batteries A2 were connected in the same manner as in Example 2, to form a battery set A2-12 of 12V and a battery set A2-48 of 48 V.

COMPARATIVE EXAMPLE 2

In the same manner as in Example 1, negative electrode plates in which the pore volume of the negative electrode active material was 0.090 cm$^3$/g were produced. Batteries B1 were produced in the same manner as in Example 1, except for the use of these negative electrode plates and the positive electrode plates E of Example 1.

Then, a plurality of the batteries B1 were connected in the same manner as in Example 2, to form a battery set B1-12 of 12V and a battery set B1-48 of 48 V.

COMPARATIVE EXAMPLE 3

A predetermined amount of the electrolyte was further injected into the batteries B1 of Comparative Example 2 under the same conditions as those of Example 3. And, batteries B2 having a free electrolyte, free from the electrode plate group, at the bottom of the battery container, were produced.

Then, a plurality of the batteries B2 were connected in the same manner as in Example 2, to form a battery set B2-12 of 12V and a battery set B2-48 of 48 V.

The respective battery sets of Examples 2 and 3 and Comparative Examples 2 and 3 obtained in the above manner were charged at a constant voltage of 2.25 V per cell in an atmosphere of 60° C. for one month. Then, at the point of elapse of one month from the start of the charge, the charge voltages of the respective batteries constituting these battery sets were measured, to obtain the maximum and minimum values of the charge voltage. Table 1 shows the results of the measurement. In Table 1, "variation" refers to the difference between the maximum and minimum values of the charge voltage.

TABLE 1

| Battery set No. | Pore volume of negative electrode active material (cm$^3$/g) | Sn content of positive electrode current collector (% by mass) | Free electrolyte | Charge voltage (V) of unit battery | | |
|---|---|---|---|---|---|---|
| | | | | Maximum value | Minimum value | Variation |
| A1-12 | 0.12 | 2.2 | Absent | 2.265 | 2.235 | 0.030 |
| A1-48 | | | | 2.280 | 2.230 | 0.050 |
| A2-12 | | | Present | 2.255 | 2.245 | 0.010 |
| A2-48 | | | | 2.260 | 2.240 | 0.020 |
| B1-12 | 0.09 | | Absent | 2.290 | 2.225 | 0.065 |
| B1-48 | | | | 2.310 | 2.210 | 0.100 |
| B2-12 | | | Present | 2.275 | 2.230 | 0.045 |
| B2-48 | | | | 2.300 | 2.220 | 0.080 |

Table 1 indicates that the battery sets A2-12 and A2-48 of Example 3 have extremely small variations in the charge voltages of the respective unit batteries, compared with the respective battery sets of Example 2, Comparative Example 2 and Comparative Example 3. It also indicates that in Comparative Examples 2 and 3, the variations in charge voltage are not so remarkable for the battery sets of 12 V (battery B1-12 and B2-12), but are extremely large for the battery sets of 48 V (battery B2-48 and B2-48).

Such variations in the charge voltages of the unit batteries become factors that cause variations in the capacities of the unit batteries. When a battery set having variations in the capacities of its respective unit batteries is discharged, a unit battery having a small capacity has a deep discharge and is therefore more susceptible to deterioration, so that the capacity of this unit battery decreases. Once the capacity begins to decrease, the SOC (state of charge) of the unit battery is constantly maintained at a low level, leading to insufficient charge. As a result, the deterioration further progresses, causing a decrease in the discharge voltage of the whole battery set. Further, when deteriorated unit batteries are forcibly overdischarged, i.e., charged reversely, the temperature of the batteries may rise abnormally, By employing the configuration of unit batteries having a free electrolyte as in the battery set of Example 3, when a plurality of unit batteries are connected in series to form a battery set, it is possible to reduce the variations in the charge voltages of the unit batteries and suppress the degradation in battery performance due to the charge variations.

INDUSTRIAL APPLICABILITY

As described above, the present invention can provide a valve-regulated lead-acid battery that is particularly suitable for use as a back-up power source and that has a stable long life, so that the present invention has large industrial values.

The invention claimed is:

1. A valve-regulated lead-acid battery comprising: an electrode plate group; and
   an electrolyte impregnated into and retained by said electrode plate group,
   said electrode plate group comprising:
   positive electrode plates that each include a positive electrode current collector comprising a Sn-containing lead alloy, and a positive electrode active material retained by said positive electrode current collector;
   negative electrode plates that each include a negative electrode current collector comprising a lead alloy, and a negative electrode active material retained by said negative electrode current collector; and
   separators,
   wherein Sn content in said positive electrode current collector is 1.6 to 2.5% by mass, and pore volume per unit mass of said negative electrode active material is 0.115 to 0.150 cm$^3$/g, and
   part of said electrolyte is a free electrolyte that is free from said electrode plate group, and said free electrolyte is in contact with said separators.

2. A valve-regulated lead-acid battery comprising a battery set, said battery set comprising a plurality of unit batteries that are connected in series, said unit batteries each comprising:
   an electrode plate group; and
   an electrolyte impregnated into and retained by said electrode plate group,
   said electrode plate group comprising:
   positive electrode plates that each include a positive electrode current collector comprising a Sn-containing lead alloy, and a positive electrode active material retained by said positive electrode current collector;
   negative electrode plates that each include a negative electrode current collector comprising a lead alloy and a negative electrode active material retained by said negative electrode current collector; and
   separators,
   wherein Sn content is said positive electrode current collector is 1.6 to 2.5% by mass, and pore volume per unit mass of said negative electrode active material is 0.115 to 0.150 cm$^3$/g, and
   part of said electrolyte is a free electrolyte that is free from said electrode plate group, and said free electrolyte is in contact with said separators.

* * * * *